United States Patent [19]

Püttmann

[11] Patent Number: 5,013,880
[45] Date of Patent: May 7, 1991

[54] PROCESS FOR WELDING A FOLLOWER PIPE TO A BURIED PIPE STRING

[75] Inventor: Franz-Josef Püttmann, Lennestadt, Fed. Rep. of Germany

[73] Assignee: Dipl.-Ing. Paul Schmidt, Lennestadt, Fed. Rep. of Germany

[21] Appl. No.: 438,349

[22] Filed: Nov. 16, 1989

[30] Foreign Application Priority Data

Nov. 24, 1988 [DE] Fed. Rep. of Germany ....... 3839633

[51] Int. Cl.$^5$ ................................................ B23K 9/00
[52] U.S. Cl. .................................. 219/61; 219/137 R; 228/48
[58] Field of Search ................. 219/61, 137 R; 228/48

[56] References Cited

U.S. PATENT DOCUMENTS 3,461,540  8/1969  Rieppel et al. ...................... 219/61
4,081,651  3/1978  Randolph et al. ................... 219/61

FOREIGN PATENT DOCUMENTS 3605961  8/1987  Fed. Rep. of Germany .
3642358  6/1988  Fed. Rep. of Germany .

Primary Examiner—Clifford C. Shaw
Attorney, Agent, or Firm—Toren, McGeady & Associates

[57] ABSTRACT

In a process for welding a pipe string driven horizontally into the ground to a follower pipe, the pipe string buried in the ground and the follower pipe are rotated. A welder then does not need to make vertical welds but can form the weld seams in a position that is most comfortable for him.

5 Claims, 3 Drawing Sheets

PROCESS FOR WELDING A FOLLOWER PIPE TO A BURIED PIPE STRING

TECHNICAL FIELD OF THE INVENTION

The invention relates to a process for welding a follower pipe to a buried pipe string.

BACKGROUND OF THE INVENTION AND PRIOR ART

Rammig in steel pipes, for instance protective or supply pipes, by means of a percussion boring device or a rammer of which the conical impact head engages, either directly or via an attachment, in the rear end of a pipe guided on supporting blocks with a cutting shoe that engages over the leading end on both the inside and the outside, has increasingly come to be used in practice. In most cases the full length of the pipe is not driven in in one piece, but short pieces, whose length depends on the size of the excavation available for preparing them for ramming in, are driven in in sucession. Each time this is done the follower pipe has to be connected by welding to the pipe or string of pipe lengths that has already been buried in the ground.

This series of operations is repeated until the complete pipe string length has been built up. Welding the individual pipe joints has however been found to involve problems in that the pipes have to be welded to one another in the starting pit around their entire circumferences in a leak-proof and impact-resistant manner. The welding thus requires qualified pipe line welders, particularly because the pipe joints have also to be welded on their undersides with the same quality. To enable the welding on the underside to be performed at least under improved conditions the starting pit is made deeper in this region. Since it is still not possible to see the welding point directly under the pipe, the welding also requires the use of a welding mirror.

OBJECT OF THE INVENTION

It is an object of the invention to provide a process with which the above-mentioned disadvantages can be avoided and with which the welding of a pipe string buried in the ground to a follower pipe is simplified.

SUMMARY OF THE INVENTION

This object is achieved according the invention by rotating the horizontal buried pipe string and the follower pipe. This surprisingly simple measure, namely rotating the buried pipe string, with its free end projecting from the ground by about 0.5 m, about its longitudinal axis, if necessary continuously, has the great advantage for the welder that complicated vertical or overhead welds are no longer necessary. In addition the welder can carry out the work in a position most comfortable for him. Rotation of the pipe string about its longitudinal axis is possible without difficulty if the follower pipe is tacked to the buried pipe string at several points around the circumference.

Rotation can advantageously be achieved by means of a chain wrench attached to the projecting end of the pipe string, i.e. manually. The force required is reduced by using a long lever on a commercially available chain wrench.

Alternatively, the pipe string can be rotated automatically. For example, a pressure-operated cylinder device, which rotates the pipe string by alternately gripping and releasing it in successive strokes, is suitable for this purpose.

It is advantageous if during rotation vibrations are introduced into the pipe string. The static friction between the outer wall of the pipe and the ground can be reduced or overcome in this way, thus in particular simplifying the rotation of a pipe string which has already been driven very deeply into the ground. These assisting vibrations can easily be produced, for example by the percussion boring machine or the rammer that is already on the site. Rotation of the pipe string can advantageously be used when machine welding the follower pipe to the pipe string, and by the use of an automatic rotating device the welding process can be made fully automatic.

BRIEF DESCRIPTION OF THE DRAWINGS

The invention will now be described in more detail with reference to an exemplary embodiment shown in the drawings, in which.

DETAILED DESCRIPTION OF PREFERRED EMBODIMENTS OF THE INVENTION

Figure 1:
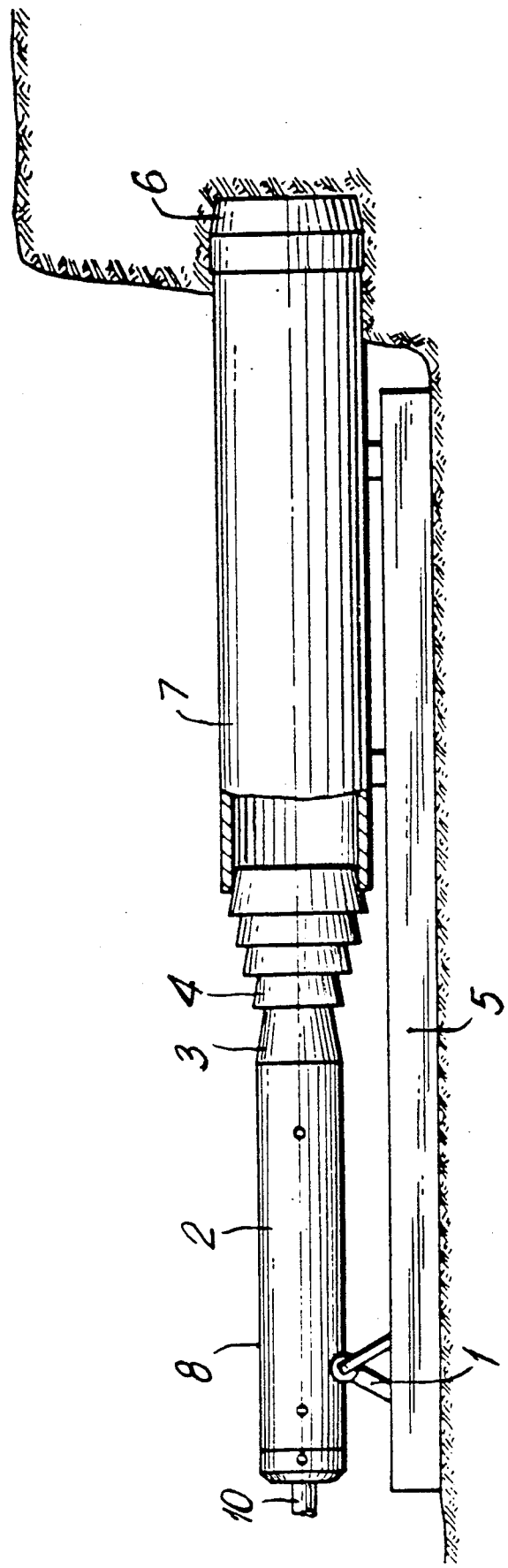
FIG. 1 shows, in a starting pit, a rammer, for ramming in a pipe horizontally, engaging in the rear end of a drive pipe directly after the start of the forward drive.

When ramming horizontally as shown in FIG. 1 a rammer 2, guided on a bearing block 1, engages with its striking head 3 via an adapter 4 in the rear end of a pipe 7 guided on a support formed as an I-beam 5 and provided at its front end with a cutting shoe 6. A percussion piston (not shown) reciprocating axially inside the housing 8 of the rammer 2 transmits a driving force to the housing 8 or the striking head 3 and the adapter 4 and forces the pipe 7 further into the ground with each stroke. The percussion piston is driven by means of compressed air which is introduced into the housing of the rammer 2 from a compressor 9 (see FIG. 2) via a pressure medium connection 10 having an integrated air lubricator 11 (see FIG. 2).

Figure 2:
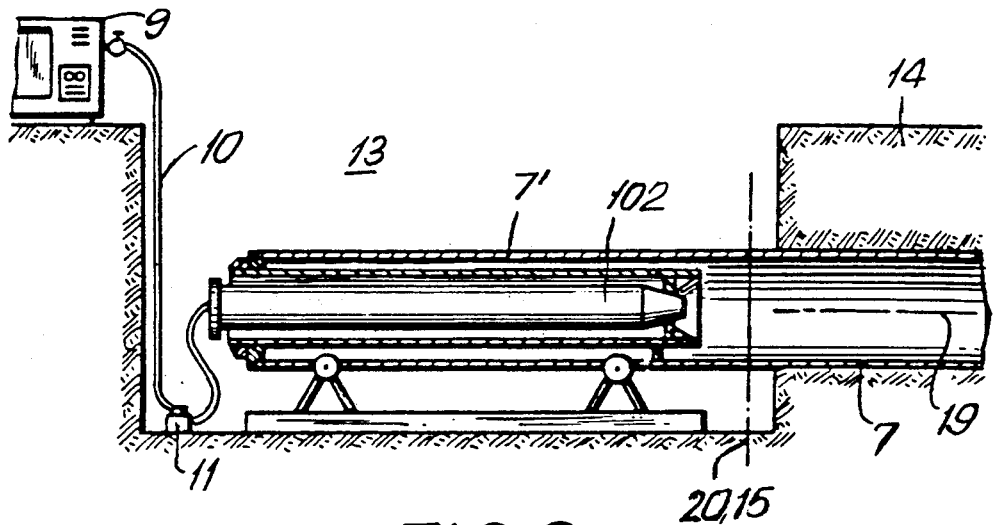
FIG. 2 shows a different rammer from that in FIG. 1 arranged in a pipe, after a follower pipe has been attached to a pipe string driven almost completely into the ground.
Figure 4:
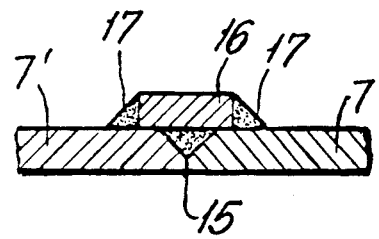
FIG. 4 shows, in section, an enlarged representation in the region of the joint indicated by a dash-dot line in FIG. 2 where a follower pipe is attached to a pipe already driven into the ground as shown in FIG. 2.

Unlike the arrangement shown in FIG. 1, the rammer or the ram boring machine 102 does not engage in the rear end of a pipe but is arranged in the pipe, which enables a shorter starting pit 13 than that in the arrangement shown in FIG. 1 to be used. FIG. 2 shows the pipe 7 (see FIG. 1) rammed almost completely into the ground 14 and the attachment of a new pipe 7', i.e. a follower pipe. As shown in detail in FIG. 4, the faces of the follower pipe 7' and of the pipe or pipe string 7 still partially projecting from the ground 14 are connected to one another with a weld seam 15; in order to reinforce the weld seam 15 steal sheets 16 are welded on with tack welds 17, for example at four points distributed around the circumference.

Figure 3:
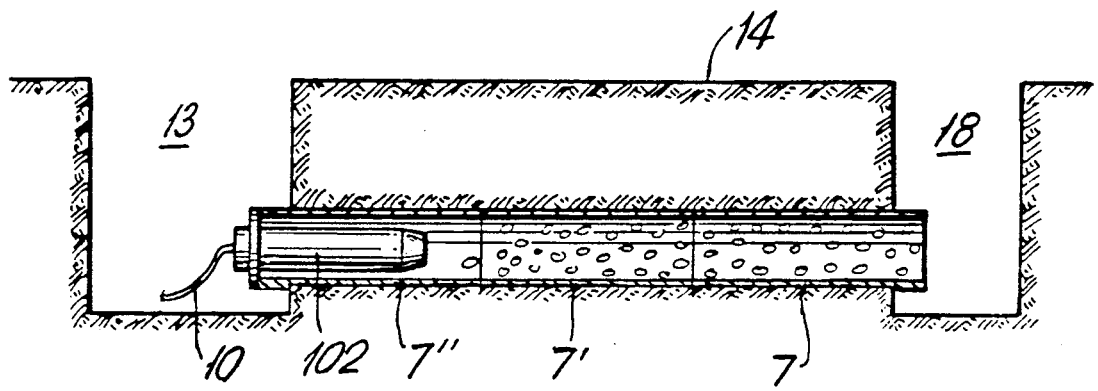
FIG. 3 shows diagrammatically a pipe string connecting the starting pit and a target pit.
Figure 5:
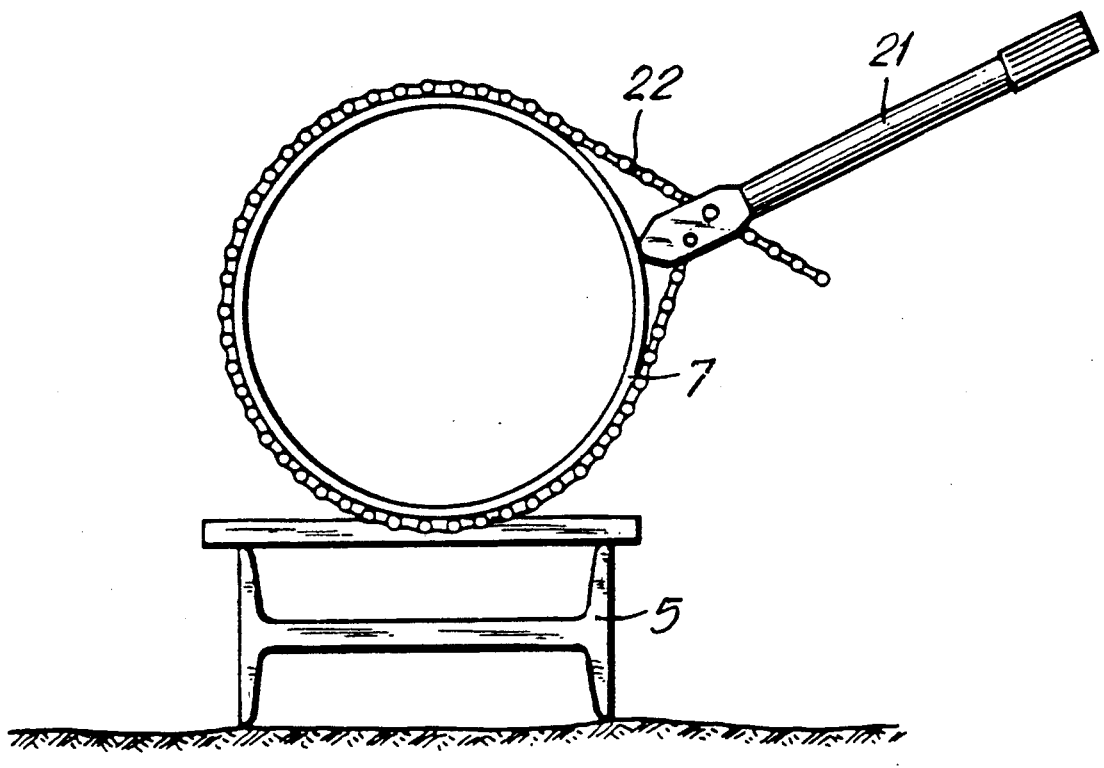
FIG. 5 shows a chain wrench embracing the front end of a pipe for manual rotation of a pipe string with its chain.
Figure 6:
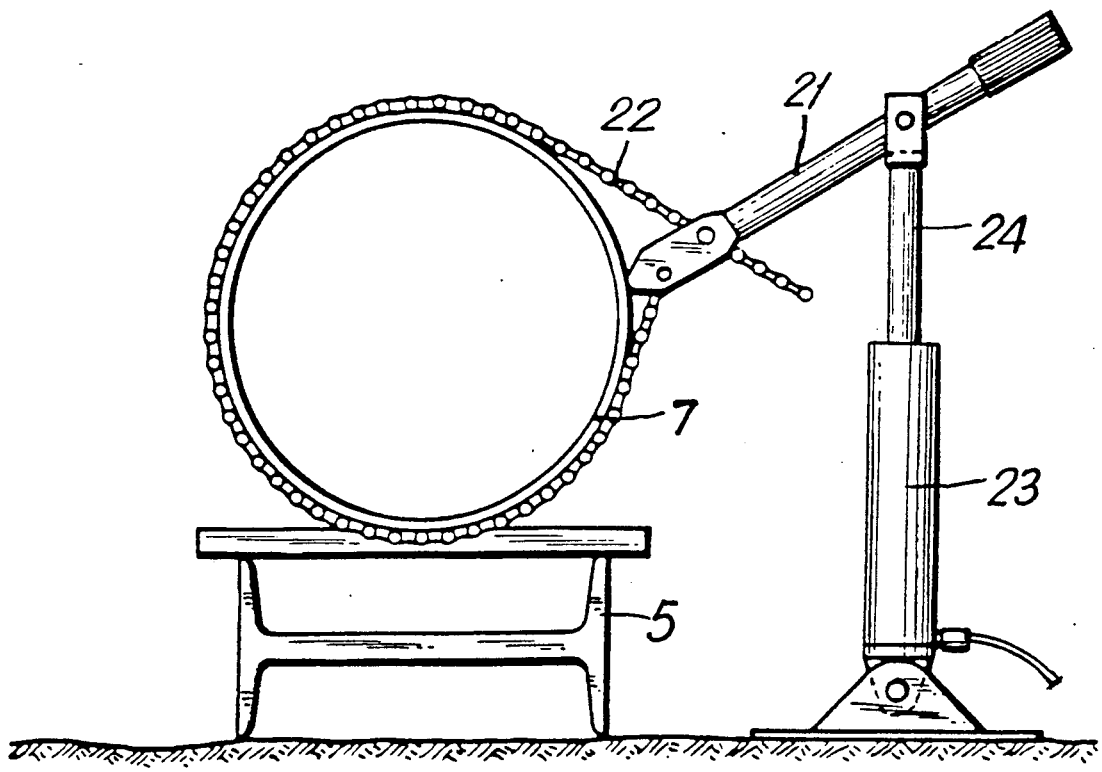
FIG. 6 shows a cylinder device connected to a chain wrench as shown in FIG. 5 for automatically rotating a pipe string by successively gripping and releasing it.

In this way as many pipes or pipe sections 7, 7′, 7″ are attached as are necessary to make a pipe connection from the starting pit 13 to a target pit 18 (see FIG. 3.). To weld on each follower pipe 7′, 7″, etc., i.e. each new length following the pipe 7 already rammed in, the buried pipe 7 or the pipe string already comprising several pipe sections is rotated about its longitudinal exis 19 either clockwise or anticlockwise. During rotation the pipe 7 already buried in the ground 14 is welded to the follower pipe 7′ along the circumferential joint 20 shown as a dash-dot line in FIG. 2. As shown in FIG. 5 the pipe 7 buried in the ground is rotated manually by means of a chain wrench 21; the chain 22 of the wrench 21 surrounds the end of the pipe 7 projecting from the ground. With the arrangement shown in FIG. 6 it is possible to rotate the pipe 7 automatically: in this case the piston rod 24 of a reversible, successively gripping and releasing cylinder device 23 is attached to the chain wrench 21. Irrespective of whether the pipes 7, 7′ etc. are welded together by machine or manually the circumferential weld seam 15 can always be formed in a favourable position, avoiding complicated vertical and-/or overhead welds.

What is claimed is:

1. A process for welding a follower pipe to a pipe string driven horizontally into the ground, comprising the steps of: rotating the pipe string buried in the ground and the follower pipe around a longitudinal axis; and, welding the follower pipe to a free end of the pipe string protruding from the ground.

2. A process according to claim 1, wherein said rotating step includes rotating the pipe string by means of a chain wrench.

3. A process according to claim 1, wherein said rotating step includes rotating the pipe string around its longitudinal axis by means of a mechanical rotating device.

4. A process according to claim 1, and further comprising the step of introducing vibrations into the pipe string.

5. A process for welding a follower pipe to a pipe string driven horizontally into the ground, comprising the steps of:
    locating the follower pipe at a free end of the pipe string protruding from the ground;
    tacking the follower pipe to the free end of the pipe string at several circumferentially distributed points;
    rotating the pipe string together with the follower pipe; and
    welding the follower pipe to the pipe string while rotating the follower pipe and pipe string.

* * * * *